(12) United States Patent
Luo et al.

(10) Patent No.: US 10,178,204 B2
(45) Date of Patent: Jan. 8, 2019

(54) INFORMATION PROCESSING METHOD AND DEVICE

(71) Applicants: The Hong Kong Polytechnic University, Hong Kong (CN); TENCENT TECHNOLOGY (SHENZHEN) COMPANY LIMITED, Shenzhen, Guangdong (CN)

(72) Inventors: Xiapu Luo, Shenzhen (CN); Jingang Hou, Shenzhen (CN); Zhiwei Liu, Shenzhen (CN); Xianneng Zou, Shenzhen (CN); Juhong Wang, Shenzhen (CN); Lei Xue, Shenzhen (CN); Yajuan Tang, Shenzhen (CN); Weigang Wu, Shenzhen (CN)

(73) Assignees: TENCENT TECHNOLOGY (SHENZHEN) COMPANY LIMITED, Shenzhen, Guangdong Province (CN); THE HONG KONG POLYTECHNIC UNIVERSITY, Hong Kong (CN)

( * ) Notice: Subject to any disclaimer, the term of this patent is extended or adjusted under 35 U.S.C. 154(b) by 380 days.

(21) Appl. No.: 14/671,544

(22) Filed: Mar. 27, 2015

(65) Prior Publication Data
US 2016/0119214 A1 Apr. 28, 2016

(30) Foreign Application Priority Data
Oct. 27, 2014 (CN) .......................... 2014 1 0584882

(51) Int. Cl.
*H04L 29/06* (2006.01)
*H04L 1/16* (2006.01)
*H04L 12/26* (2006.01)

(52) U.S. Cl.
CPC ............ *H04L 67/42* (2013.01); *H04L 1/1678* (2013.01); *H04L 43/106* (2013.01); *H04L 69/16* (2013.01);
(Continued)

(58) Field of Classification Search
CPC ............ H04L 43/0835; H04L 43/0864; H04L 43/087; H04L 43/0882; H04L 43/103; H04L 43/106; H04L 67/42; H04L 69/16
See application file for complete search history.

(56) References Cited

U.S. PATENT DOCUMENTS

| 3,707,186 A | 12/1972 | Zorrilla et al. |
| 4,897,908 A | 2/1990 | Henriksson |

(Continued)

FOREIGN PATENT DOCUMENTS

| DE | 3022480 A1 | 1/1982 |
| DE | 19548688 A1 | 6/1997 |
| EP | 1065467 A2 | 1/2001 |
| EP | 1995543 A1 | 11/2008 |
| JP | 08-291996 A | 11/1996 |
| WO | 2009066260 A1 | 5/2009 |

OTHER PUBLICATIONS

J. Sommers, P. Barford, N. Duffield, and A. Ron, "A framework for multi-objective sla compliance monitoring," in Proc. IEEE INFOCOM, 2007, pp. 2446-2450.

(Continued)

*Primary Examiner* — Asad M Nawaz
*Assistant Examiner* — Saad A. Waqas
(74) *Attorney, Agent, or Firm* — Morgan, Lewis & Bockius LLP

(57) ABSTRACT

It is described an information processing method and device. It is received a request for service data from a client device. In response to the request for service data, it is sent at least two probing packets which contain the service data to the client device on a forward path which is from a server to the client device. It is obtained timing information, which (Continued)

includes: a time stamp corresponding to the service data, a time stamp corresponding to the request for the service data, and time stamps corresponding to at least two backward-path packets sent by the client device on a backward path, the backward path being from the client device to the server. It is determined according to the timing information a one-way path metric.

15 Claims, 10 Drawing Sheets

(52) U.S. Cl.
CPC ........ *H04L 43/087* (2013.01); *H04L 43/0835* (2013.01); *H04L 43/0864* (2013.01); *H04L 43/0882* (2013.01); *H04L 43/103* (2013.01); *H04L 43/14* (2013.01)

(56) References Cited

U.S. PATENT DOCUMENTS

| | | | | |
|---|---|---|---|---|
| 6,442,141 | B1* | 8/2002 | Borella | H04L 12/2602 370/248 |
| 6,868,094 | B1* | 3/2005 | Bordonaro | H04L 41/5009 370/516 |
| 7,457,868 | B1* | 11/2008 | Guo | H04L 12/2602 709/203 |
| 2005/0040023 | A1 | 2/2005 | Hino et al. | |
| 2007/0076605 | A1* | 4/2007 | Cidon | H04L 12/2697 370/230 |
| 2008/0037420 | A1* | 2/2008 | Tang | H04L 1/1607 370/229 |
| 2008/0259813 | A1* | 10/2008 | Matta | H04L 12/2602 370/252 |
| 2009/0213828 | A1* | 8/2009 | Brundage | G01S 5/0289 370/338 |
| 2010/0128606 | A1* | 5/2010 | Patel | H04L 12/5691 370/235 |
| 2010/0315958 | A1* | 12/2010 | Luo | H04L 12/2602 370/248 |
| 2011/0161701 | A1* | 6/2011 | Blixt | H03L 1/026 713/320 |
| 2015/0333993 | A1* | 11/2015 | Welin | H04L 43/0882 370/252 |

OTHER PUBLICATIONS

D. Croce, T. En-Najjary, G. Urvoy-Keller, and E. Biersack, "Capcaity estimation of ADSL links," in Proc. ACM CoNEXT, 2008, Dec. 10-12, 2008.

R. Kapoor, L. Chen, L. Lao, M. Gerla, and M. Sanadidi, "CapProbe: A simple and accurate capacity estimation technique,"in Proc. ACM SIGCOMM, 2004.

X. Luo, E. Chan, and R. Chang, "Design and implementation of TCP data probes for reliable and metric-rich network path monitoring," in Proc.USENIX ATC, 2009.

Ying Zhang, Z. Morley Mao, and Ming Zhang, "Detecting traffic differentiation in backbone isps with NetPolice," in Proc. ACM IMC, 2009.

M. Dhawan, J. Samuel, R. Teixeira, C. Kreibich, M. Allman, N. Weaver, and V. Paxson, "Fathom: a browser-based network measurement platform," in Proc. ACM IMC, 2012.

R. Rajamony and M. Elnozahy, "Measuring client-preceived response time on the www," in Proc. USENIX USITS, 2001.

R. Krishnan, H.Madhyastha, S. Srinivasan, S. Jain, A. Krishnamurthy, T. Anderson and J. Gao, "Moving beyond end-to-end path information to optimize CDN performance," in Proc. ACM IMC, 2009.

C. Kreibich, N. Weaver, B. Nechaev, and V. Paxson, "Netalyzr: Illuminating the edge network," in Proc. ACM IMC, 2010, pp. 246-259.

A. Janc, C. Wills, and M. Claypool, "Network performance evaluation in a web browser," in Proc. IASTED PDCS, 2009.

P. Kanuparthy and C. Dovrolis, "Pythia: Diagnosing performance problems in wide area providers," in Proc. USENIX ATC,2014.

R. Mok, X. Luo, E. Chan, and R. Chang, "QDASH: a QoE-aware DASH system," in Proc. ACM MMSys, 2012.

X. Zhou and P. Mieghem, "Reordering of IP packets in internet," in Proc. PAM, 2004.

S. Savage, "Sting: a TCP-based network measurement tool," in Proc. USENIX USITS, 1999.

H. Balakrishnan, V. Padmanabhan, G. Fairhurst, and M. Sooriyabandara, "TCP performance implication of network path asymmetry," RFC 3449, IETF, 2002, pp. 1-41.

E Chan, A. Chen, X. Luo, R. Mok, W. Li, and R. Chang, "Trio: Measuring asymmetric capacity with three minimum round-trip times," in Proc. ACM CoNEXT, 2011.

R. Mahajan, M. Zhang, L. Poole, and V. Pai, "Uncovering performance differences among backbone ISPs with Netdiff," in Proc. NSDI, 2008.

R. Mahajan, N. Spring, D. Wetherall, and T. Anderson, "User-level Internet path diagnosis," in Proc. ACM SOSP, 2003.

European Search Report issued in European Patent No. 14003968.6 dated Apr. 30, 2015.

Constantinos Dovrolis et al., "Packet-Dispersion Techniques and a Capacity-Estimation Methodology", IEEE/ACM Transactions on Networking, vol. 12, No. 6, Dec. 2004, pp. 963-977.

Tadayoshi Kohno et al., "Remote Physical Device Fingerprinting", Copyright the IEEE Symposium on Security and Privacy May 25, 2005.

* cited by examiner

| β (ms) | Normal scenario | | | | With 25% CPU load | | | |
|---|---|---|---|---|---|---|---|---|
|  | 30 | 50 | 100 | 150 | 30 | 50 | 100 | 150 |
| L_FF_NT | 0.067/0.442 | 0.2/0.476 | -0.033/0.18 | -0.067/0.573 | 0.033/0.482 | 0.111/0.416 | -0.033/0.482 | 0.033/0.482 |
| L_CH_NT | 0.033/0.657 | 0.233/0.616 | 0.267/0.68 | 0.2/0.6 | 0.267/0.573 | 0.467/0.718 | 0.333/0.537 | 0.533/0.67 |
| L_CH_RT | 0.1/0.651 | 0.067/0.359 | 0.3/0.526 | 0.267/0.629 | 0.033/0.657 | 0.367/0.657 | 0.367/0.657 | 0.3/0.526 |
| W_FF_NT | 0.167/0.373 | 0.3/0.458 | 0.433/0.667 | 0.867/0.499 | 0.333/0.537 | 0.367/0.482 | 0.033/0.18 | 0.233/0.761 |
| W_CH_NT | 0.3/1.969 | -0.2/0.6 | -0.067/1.611 | -1.067/0.573 | -1.8/0.763 | -0.033/0.547 | -2.533/4.209 | -0.1/0.539 |
| W_CH_RT | 0.067/0.68 | 0.367/1.816 | -0.867/1.784 | -1.233/0.803 | 0.133/0.562 | -0.133/0.921 | -3.8/7.786 | -0.4/0.952 |
| W_IE_NT | -16.433/5.869 | -18.6/11.005 | -32.533/24.838 | -41.3/38.569 | -17.4/5.851 | -37.367/9.465 | -45.633/19.541 | -54.9/34.388 |
| W_IE_RT | -0.133/0.806 | 0.067/0.359 | -0.433/0.989 | -0.067/0.892 | 0.133/0.718 | -0.133/0.427 | -0.1/0.473 | -0.533/1.087 |

# INFORMATION PROCESSING METHOD AND DEVICE

CROSS-REFERENCE TO RELATED APPLICATIONS

This patent application claims the priority of the Chinese Patent Application No. 201410584882.0, entitled "INFORMATION PROCESSING METHOD AND DEVICE," filed on Oct. 27, 2014, which is hereby incorporated by reference herein in its entirety.

TECHNICAL FIELD

In various embodiments, the present disclosure relates to the field of communications, and in particular to an information processing method and device.

BACKGROUND

With the rapid development and considerable diversity of IP services, it is very important to ensure the quality of data transmission over the IP network.

The asymmetry of Internet paths stimulates the one-way path measurement because of the asymmetric. Characterizing one-way path metrics from a web server is invaluable to online services (e.g., video streaming and CDN (Content Delivery Network)), because such knowledge allows the providers to adaptively tune their services for improving QoE (Quality of Experience) and better understand the conditions of network paths between their client devices and themselves. For instance, knowing one-way path performance from a set of servers to a client device, a CDN controller can direct the client device to the most suitable server. Such information can also facilitate streaming services to select a proper bitrate for a client device and help service providers differentiate ISPs' performance and diagnose network faults.

SUMMARY

According to an aspect of the disclosure, it is provided an information processing method. It is received a request for service data from a client device. In response to the request for service data, it is sent at least two probing packets which contain the service data to the client device on a forward path which is from a server to the client device. It is obtained timing information, which includes: a time stamp corresponding to the service data, a time stamp corresponding to the request for the service data, and time stamps corresponding to at least two backward-path packets sent by the client device on a backward path, the backward path being from the client device to the server. It is determined according to the timing information a one-way path metric.

According to another aspect of the disclosure, it is provided an information processing device. The device includes one or more processors; and a memory coupled to the one or more processors; program modules stored in the memory, the program modules being executable by the one or more processors to: receive a request for service data from a client device; in response to the request for service data, send at least two probing packets which contain the service data to the client device on a forward path which is from the server to the client device; obtain timing information, which comprises: a time stamp corresponding to the service data, a time stamp corresponding to the request for the service data, and time stamps corresponding to at least two backward-path packets sent by the client device on a backward path which is from the client device to the server; and determine according to the timing information a one-way path metric.

According to another aspect of the disclosure, it is provided a non-transitory computer-readable storage medium storing instructions thereon for execution by at least one processing circuit. The instructions includes: receiving a request for service data from a client device; in response to the request for service data, sending at least two probing packets which contain the service data to the client device on a forward path which is towards the client device; obtaining timing information, which include: a time stamp corresponding to the service data, a time stamp corresponding to the request for the service data, and time stamps corresponding to at least two backward-path packets sent by the client device on a backward path which is from the client device to the server; and determining according to the timing information a one-way path metric.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

BRIEF DESCRIPTION OF THE DRAWINGS

In the following, embodiments of the present disclosure will be discussed with reference to drawings. It should be understood that the drawings illustrate generally, by way of example, but not by way of limitation, various embodiments discussed in the present disclosure.

DETAILED DESCRIPTION

Despite its usefulness, measuring one-way metrics from a web server is very challenging and existing solutions suffer from the following limitations.

1) Few Low-level One-way Path Metrics

Low-level one-way metrics (e.g., packet loss, packet reordering, jitter, and capacity, etc.) are indispensable for characterizing path properties, because they directly affect online services through factors like throughput, QoE, etc. However, existing systems (e.g., speedtest, boomerang (http://yahoo.github.io/boomerang)) can only measure a few metrics, such as, round-trip time (RTT), TCP bulk-transfer capacity, etc., and the accuracy is limited by their incapability to access low level information.

Packet loss may be referred to those lost during transmission over a one-way path. Packet reordering may indicate that the sequence of packets arriving at a receiver is different from the sequence of packets sent from a sender.

2) Deployment Issues

Most existing systems require installing specific softwares or plugins at the client device side. Although they may simplify the measurement, not all client devices are willing to install such software/plugins due to security considerations, limiting their popularity. As such, most existing systems are only applied for client devices who require low security (e.g., client devices without firewalls, or client devices with firewalls which are in weak security). For client devices with high security requirements, it may be impossible to perform one-way path measurement since it is not allowed to install specific software or plugins at the client device side.

3) Heavy Overhead

Existing systems usually perform individual measurement for each metric and therefore, cause heavy network overhead when measuring multiple metrics. It is desirable to measure multiple metrics simultaneously to reduce the impact of the measurement on network paths.

4) Restricted Usage Due to Client-Device-Side Firewalls

Many existing systems conduct measurement by sending special packets (e.g., ICMP (Internet Control Messages Protocol)) instead of packets carrying application data to induce responses from remote hosts. Although they do not require software installation at remote hosts, they are unsuitable for server-side measurement because client devices' perimeter firewalls usually filter out all these unsolicited packets.

To overcome one or more of these limitations, embodiments of the present disclosure provide an information processing method, capable of obtaining timing information, and based on which determining one or more metrics.

Figure 1:
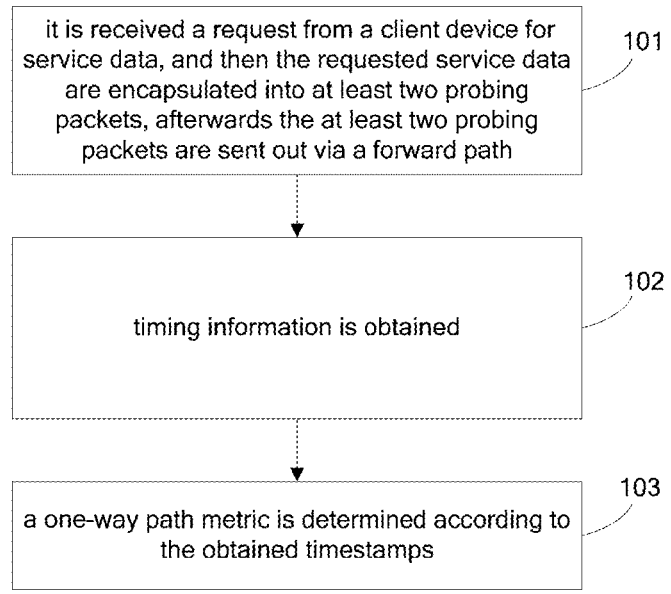
FIG. 1 is a flow chart of an information processing method according to an embodiment of the present disclosure.

Referring to FIG. 1, an information processing method according to an embodiment of the present disclosure includes steps 101-103 which may be implemented for example at a server.

At step 101, it is received a request from a client device for service data, and then the requested service data are encapsulated into at least two probing packets, afterwards the at least two probing packets are sent out via a forward path.

In an example, the probing packet carry real application data, that is, the requested service data is the payload of the probing packet.

At step 102, timing information is obtained.

Since the probing packet is carried with service data (for example, a web object such as a picture), the browser in the client device can store a timestamp when the probing packet arrives at the client device. As such, a timestamp can be gathered through Javascript in the browser page.

The timing information may include a timestamp corresponding to a piece of service data, a timestamp corresponding to a request for service data, a timestamp corresponding to a packet which is sent from a client device via a backward path (referred to as backward-path packet). There may be at least two backward-path packets.

In some examples, the client device may use Resource Timing and High Resolution Time (RT/HRT) or NT and HRT (NT/HRT) to obtain the time stamp when the request is sent and the time stamps when the probing packets are received, and then send the backward-path packets carrying these obtained time stamps to the server. In some examples, these obtained time stamps may be contained in the headers of the backward-path packets.

The forward path and backward path have opposite transmission directions. In an example, the forward path is from the server to the client device and the backward path is from the client device to the server.

The service data may be referred to data of various applications. For example, the service data may be web page, and a web object of the web page may be encapsulated into the probing packet. That is, the probing packet carries real application data, so that can penetrate the firewalls of the client device. In another example, the service data may be streaming media data.

At step 103, a one-way path metric is determined according to the obtained timestamps. The one-way path metric can characterize a transmission property of the one-way path.

The one-way path metric for the forward path may include forward-path packet loss which is for example used to determine a packet loss rate, forward-path packet reordering, forward-path jitter and forward-path capacity. The one-way path metric for the backward path may include backward-path packet loss which is for example used to determine a packet loss rate, backward-path packet reordering, backward-path jitter and backward-path capacity.

In an example, there may be two probing packets. The request service data are encapsulated into a first probing packet and a second probing packet. There is a first acknowledge number included in (for example, the header of) the first probing packet and a second acknowledge number included in (for example, the header of) the second probing packet. The second acknowledge number is equal to a sum of the sequence number of the request for service data and the length of the payload. The first acknowledge number is smaller than the second acknowledge number.

The following will elaborate how to determine the one-way path metric.

1) Forward-path Packet Loss

Since packets in the client device cannot be captured, for each piece of service data (e.g., a web object of a web page), the embodiments of the present disclosure use two time-stamps to detect the forward-path packet loss, i.e., a first time stamp when a first byte of the piece of the service data is received (the first byte of the piece of the service data is always carried in the first probing packet), and a second time stamp when the piece of the service data is completely received (i.e., the last byte of the piece of the service data is received).

If the first probing packet is lost, the client device will receive the second probing packet firstly. The time stamp when the client device receives the retransmitted first probing packet is the time stamp when the client device receives the first byte of the piece of the service data, is also the time stamp when the client device receives the complete service data.

In the case the difference between the second time stamp and the first time stamp corresponds to the server's retransmission timeout (RTO), it is indicated the second probing packet is lost on the forward path.

In the case the difference between the second time stamp and the first time stamp corresponds to the RTT, it is indicated both the first and second probing packets are lost on the forward path.

2) Backward-path Packet Loss

After receiving the two probing packet, the client device will send back two packets over the backward path, i.e., a first backward-path packet and a second backward-path packet.

Let a third time stamp denote the time when the first backward-path packet is received, and let a fourth time stamp denote the time when the second backward-path packet is received.

Both the third and fourth time stamps correspond to backward-path packets sent from the client device over the backward path.

It is determined the arrival sequence of the first and second backward-path packet.

In the case the second backward-path packet arrives at the server before the first backward-path packet, and the difference between the fourth time stamp and the third time stamp corresponds to the RTO of the client device, it is indicated the first backward-path packet is lost.

In the case the first backward-path packet arrives at the server before the second backward-path packet, and the difference between the fourth time stamp and the third time stamp corresponds to the RTO of the client device, it is indicated the second backward-path packet is lost.

In the case the first backward-path packet arrives at the server before the second backward-path packet, and the difference between the fourth time stamp and the third time stamp corresponds to a first sum, it is indicated both the first and second backward-path packets are lost. The first sum is equal to the RTO of the client device plus a first difference value. The first difference value is equal to the difference between the timestamp when the second backward-path packet is received and the timestamp when the first backward-path packet is received in the case none of the first and second backward-path packets is lost.

3) Forward-path Packet Reordering

It is determined whether the server receives an ACK packet whose ACK number is equal to the sequence number of the first probing packet, if yes, it is determined forward-path packet reordering occurs.

4) Backward-path Packet Reordering

On the other hand, it is easier to detect packet reordering on the backward path because the server can capture all packets from the client device.

In case the second backward-path packet is received before the first backward-path packet and the difference between the third time stamp and the fourth time stamp is much smaller than the RTO of the client device (e.g., the ratio of the difference between the third time stamp and the fourth time stamp to the RTO of the client device is smaller than a preset threshold), it is determined packet reordering on the backward path occurs.

5) Forward-path Capacity

The forward-path capacity may be determined as a ratio of the length of the probing packet to a second sum. The second sum is equal to the difference (i.e., a second difference) between the second time stamp and the first time stamp plus the noise.

To raise the accuracy of the forward-path capacity, we may, for example, dispatch Nu (Nu is an integer $\geq 1$) padding packets between the two probing packets. Padding packets have TTL (Time To Live) values less than the TTL values of probing packets, so as to make them not arrive at the client device. In this example, the forward-path capacity is determined as a ratio of a first product to the second sum. The first product is equal to the length of the probing packet multiplied by (Nu+1).

To raise the accuracy of the calculation of the forward-path capacity, we may, for example, filter out biased sample from the timing information before calculating the forward-path capacity. The biased sample may be referred to those time stamps associated with a piece of service data which is requested by the client device.

6) Backward-path Capacity

The backward-path capacity may be determined as a ratio of the length of the backward-path packets to a third difference value. The third difference value is equal to the difference between the fourth time stamp and the third time stamp.

To raise the accuracy of the calculation of the backward-path capacity, we may, for example, filter out biased sample from the timing information before calculating the backward-path capacity.

7) Forward-path Jitter

The forward-path jitter may be determined as a difference between a fifth difference value and a fourth difference value.

The fourth difference value is equal to a difference between a time stamp when the client device sends the request for the $i^{th}$ (i is an integer equal to or greater than 1) service data (in case the webpage is requested, the request for the $i^{th}$ service data is to request the $i^{th}$ web object in the webpage) and a time stamp when the server sends a corresponding probing packet (containing the service data corresponding to the request for the $i^{th}$ service data) for the initial time. The fifth difference value is equal to a difference between a time stamp when the client device sends the request for the $(i+1)^{th}$ service data and a time stamp when the server sends a corresponding probing packet (containing the service data corresponding to the request for the $(i+1)^{th}$ service data) for the initial time.

When a web page is requested, the request for the $i^{th}$ service data points to the $i^{th}$ web page in the requested web page.

When a request for the $(i+1)^{th}$ service data from the client device is received, the difference between a time stamp when a probing packet is sent and a time stamp when the probing packet is received is equal to the fourth difference value.

8) Backward-path Jitter

Let a difference between a time stamp when the client device sends the request for the $i^{th}$ service data and a time stamp when the server receives the request for the $i^{th}$ service data as a sixth difference value. Let a difference between a time stamp when the client device sends the request for the $(i+1)^{th}$ service data and a time stamp when the server receives the request for the $(i+1)^{th}$ service data as a seventh difference value. The backward-path jitter is equal to the difference between the seventh difference value and the sixth difference value.

Figure 2:
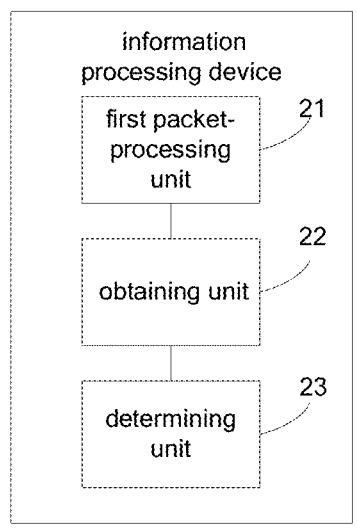
FIG. 2 is a schematic diagram illustrating the structure of an information processing device according to an embodiment of the present disclosure.

The embodiments of the present invention further provides an information processing device, including a first packet-processing unit 21, an obtaining unit 22 and a determining unit 23, as shown in FIG. 2.

The first packet-processing unit 21 is configured to: receive a request for service data from a client device; in response to the request for service data, send at least two probing packets which contain the service data to the client device on a forward path.

The obtaining unit 22 is configured to obtain timing information, which include: a time stamp corresponding to the service data, a time stamp corresponding to the request for the service data, and time stamps corresponding to at least two backward-path packets sent by the client device on a backward path.

The determining unit 23 is configured to determine a one-way path metric according to the timing information.

As can be understood, the information processing device can implement the information processing method of each embodiment of the present disclosure.

Figure 13:
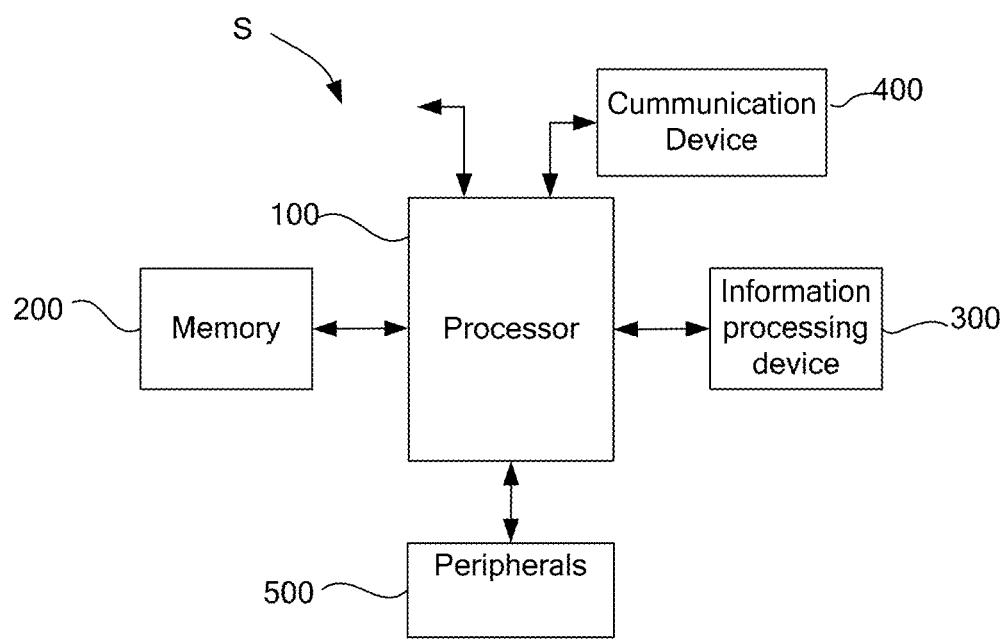
FIG. 13 shows a structure of a server according to an embodiment of the disclosure.

The embodiments of the present disclosure further provide a server, including the information processing device as shown in FIG. 2. The server may be for example shown as FIG. 13.

In the scenario of CDN network, the information processing device as shown in FIG. 2 may be located in a web server and/or a resource server.

Figure 3:
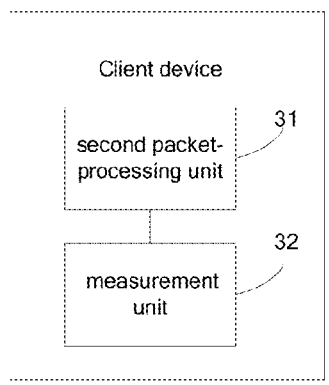
FIG. 3 is a schematic diagram illustrating a client device according to an embodiment of the present disclosure.

The embodiments of the present disclosure further provide a client device, including a second packet-processing unit 31 and a measurement unit 32, as shown in FIG. 3.

The second packet-processing unit is configured to: send a request for service data to a server, and send to the server at least two backward-path packet carrying timestamps obtained by the measurement unit 32.

The measurement unit 32 is configured to: obtain a time stamp when the request for the service data is sent, time stamps when the client device receives the probing packets, time stamps when the client device sends backward-path packets after receiving the probing packets.

In an example, the measurement unit 32 uses RT/HRT to obtain these timestamps or uses NT/HRT to obtain these timestamps.

In some examples, each unit of the information processing device may be implemented as the microprocessor.

The embodiments of the present disclosure further provide an information processing system, including the server and the client device as described herein.

In the following embodiments of the present application, the information processing device is referred to as OWP-Scope.

Figure 4:
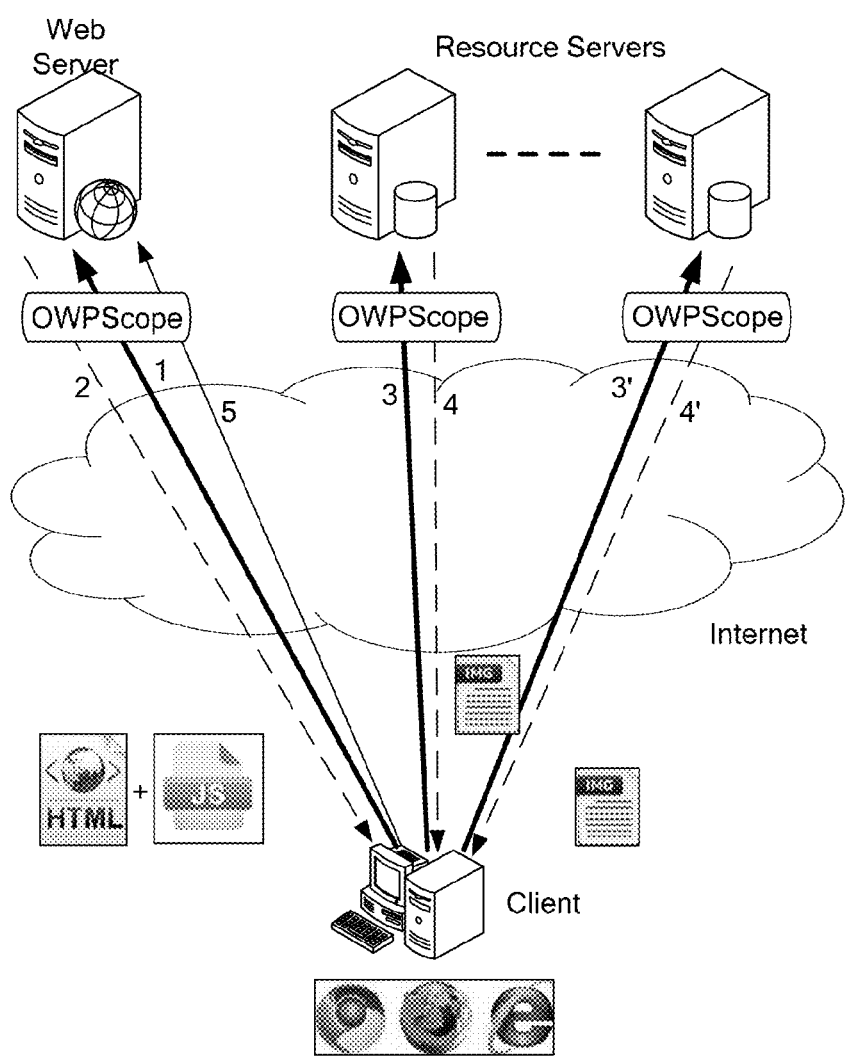
FIG. 4 is a schematic diagram illustrating an application scenario of selecting a suitable CDN server according to an embodiment of the present disclosure.

OWPScope consists of two key components: (i) a server-side measurement module that sends crafted probing packets and inspects packets from client devices to compute the metrics and (ii) a piece of javascript as) code running in a client device's browser to collect required timestamps through HTML5 interfaces. FIG. 4 illustrates one application scenario of OWPScope, where it is deployed to a web server and other resource servers in a CDN (content delivery network) network. When a client device visits the front page of the web server (step 1), the js code will be downloaded and executed in the client device's browser (step 2), some embedded web objects (e.g., images) will be fetched from other resource servers (steps 3, 4, 3', 4'). After the browser receives probing packets carrying these web objects, which are sent by OWPScope, the js code collects a set of timing information and sends them back to the web server (step 5). By processing such data, OWPScope obtains the one-way performance between the client device and each resource server and can redirect the client device to the most suitable server (e.g., a server with the highest data transmission speed).

The OWPScope empowers web servers to simultaneously measure four low-level one-way path metrics, i.e., packet loss, packet reordering, capacity, and jitters. OWPScope exploits only standard features in HTML5, HTTP, and TCP without requiring specific software/plugins installed at the client device side. With specially crafted probe packets in an established TCP connection, OWPScope can penetrate client-device-side firewalls and perform measurement with low overhead by correlating information gleaned from the application and the TCP levels. Moreover, OWPScope uses packets carrying real application data (i.e., probing packets) to conduct representative measurement.

Three HTML5 features, i.e., Navigation Timing (NT), Resource Timing (RT) and High Resolution Time (HRT), can be used by OWPScope to collect timing information on the client device side. NT and HRT are W3C's recommendation (i.e., standard) and supported by major browsers, while RT is W3C's Candidate Recommendation and currently supported by IE and Chrome.

Specifically, NT provides an interface to obtain timestamps in millisecond resolution for a set of events during a web page's loading cycle. Meanwhile, RT offers an interface to collect timing information associated with each resource within a document. From NT (or RT), OWPScope collects three timestamps: (1) requestStart, denoted as $T_{qs}$, the time immediately before the browser sends a request for a web page (or a resource) (in other words, the time when the browser sends a request for a web page (or a resource)); (2) responseStart, denoted as $T_{ps}$, the time immediately after the browser receives the first byte of a web page (or a resource) (that is, the time when the browser receives the first byte of a web page (or a resource)); (3) responseEnd, denoted as $T_{pe}$, the time immediately after the browser receives the last byte of a web page (or a resource) (that is, the time when the browser receives the last byte of a web page (or a resource). In addition, OWPScope relies on HRT to obtain the current time in sub-millisecond resolution, which is not subject to system clock skew or adjustments.

Figure 5:
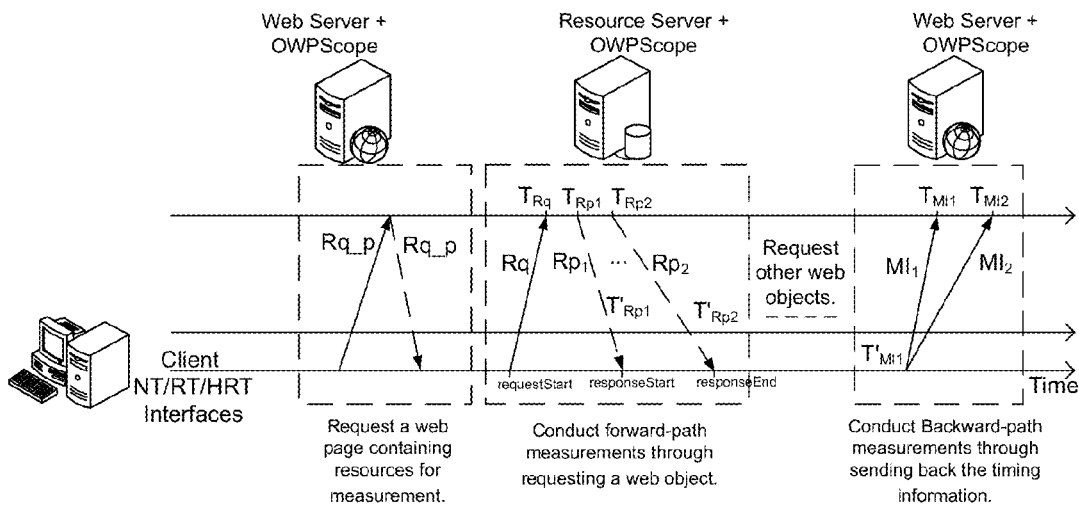
FIG. 5 shows the measurement process according to an embodiment of the present disclosure.

FIG. 5 illustrates OWPScope's measurement process and the collected timing information when RT is available. The forward path is from a server to a client device and the backward path is from a client device to a server. At the beginning, the client device (i.e., C) sends a request (i.e., Rq_P) for a web page (i.e., Rp_P) that contains several small web objects (like figures) and OWPScope's js code. In some examples, these web objects (i.e., resources in the resource server), to be fetched by the client device, are in the same server as the web page. In other examples, these web objects, to be fetched by the client device, are in one or more resource servers while the web page is in the web server, as shown in FIG. 5.

Let W be one web object requested by C through Rq, whose sending time is recorded in $T_{qs}$. In some example, the client device or the client device's browser runs the js code and uses RT and HRT to record the sending time of Rq. On the arrival of Rq, OWPScope logs its arrival time $T_{Rq}$ and replies with 2 probing packets, which carry the content of W, and Nu (Nu≥1) padding packets, which are dispatched between 2 probing packets. Padding packets are the same as probing packets except that they have limited TTL values so that they will be routed through the same path as probing packets and dropped by a router a few hops away from C. Sending padding packet is to increase the accuracy of a one-way path metrics (will be explained below). In some examples, there may be no padding packets (i.e., Nu=0).

Let $T_{Rp1}$ and $T_{Rp2}$ be the sending time of $Rp_1$ and $Rp_2$, and $T'_{Rp1}$ and $T'_{Rp2}$ denote the time when they reach C. The browser records the time when $Rp_1$ (or $Rp_2$) is delivered to it in $T_{ps}$ (or $T_{pe}$) before rendering W. When Rp_P has multiple web objects, the browser will record each object's $T_{qs}$, $T_{ps}$, and $T_{pe}$. Finally, the js code in the web page fetches the stored values through RT and sends them along with padded content (may be any content) to OWPScope. The padded content is long enough so that the client device will send back 2 packets (i.e., $MI_1$ and $MI_2$), whose sending times and arriving times are denoted as $T'_{MIi}$ and $T_{MIi}$ (which may be obtained by C through the RT/HRT) respectively. After a predefined delay, the web page will be automatically reloaded for another round of measurement.

If the browser only supports NT, OWPScope regards the requested web page (rather than resources of the web page) as W. The browser will also record the arrival time of $Rp_1$ (or $Rp_2$) in $T_{ps}$ (or $T_{pe}$).

The following will discuss metric measurement methods.

1. One-way Packet Loss
1) One-way Packet Loss on the Forward Path

It is challenging to detect the loss of probing packets because we cannot capture packets in C. OWPScope addresses this issue by driving C to generate different responses in the presence or the absence of probing packets. More precisely, OWPScope instructs Rp1 to acknowledge part of Rq1. Let $SN_{Rq1}$ and $L_{Rq1}$ (which may be contained in the header of Rq1) denote the sequence number and the length of Rq1, respectively. OWPScope sets $Rp_1$'s acknowledge number to $SN_{Rq1}+L_{Rq1}/2$ and that of $Rp_2$ to $SN_{Rq1}+L_{Rq1}$.

1.1) Rq1 is Lost

A client device sends Rq1 to a resource server for requesting the web object W. The resource server sends probing packets Rp1 and Rp2 containing W to the client device.

Figure 6A:
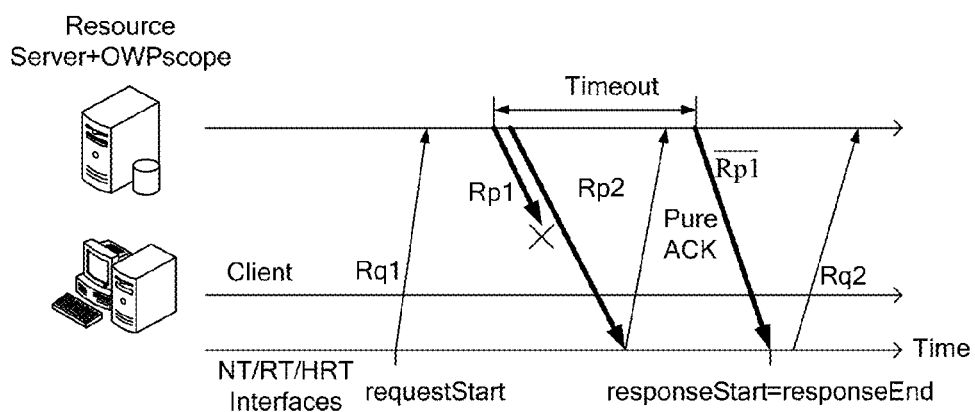
FIG. 6a shows the process of detecting the first probing packet on the forward path is lost according to an embodiment of the present disclosure.

As shown in FIG. 6a, if Rp1 is lost, Rp2 triggers a pure ACK packet. The server starts timing when sending Rp1, if an ACK packet whose ACK number is $SN_{Rq1}+L_{Rq1}/2$ is still not received when timeout occurs, the server retransmits Rp1 after timeout, denoted as $\overline{Rp1}$, and then C sets $T_{ps}$ and $T_{pe}$ with the same value (sometimes there may be negligible difference due to noise). Because of the request-response nature of HTTP, C can only send out Rq2 for next web object through the same TCP connection after Rp1 has been received.

1.2) Rp2 is Lost

Figure 6B:
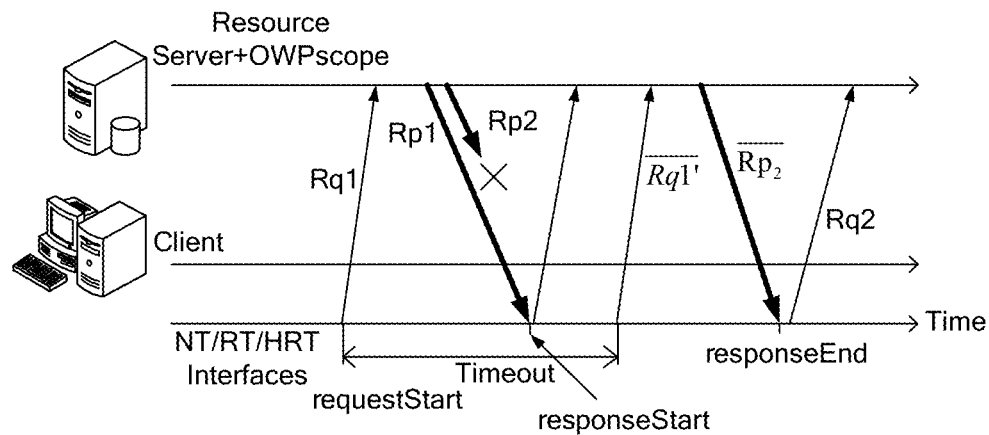
FIG. 6b shows the process of detecting the second probing packet on the forward path is lost according to an embodiment of the present disclosure.

If Rp2 is lost as shown in FIG. 6b, a pure ACK will be sent after the delayed ACK timer (starting timing at the moment when receiving Rp1) expires, indicating that Rp1 has been received. Since Rp1 only acknowledges part of Rq1, C will retransmit the unacknowledged portion, denoted as $\overline{Rq1'}$. The server will retransmit Rp2 after timeout (i.e., $\overline{Rp2}$). Therefore, the difference between Tpe and Tps approximates to the server's retransmission timeout (RTO). The new request (i.e., Rq2) will be dispatched after $\overline{Rp2}$ is received.

1.3) Both Rq1 and Rq2 are Lost

Figure 6C:
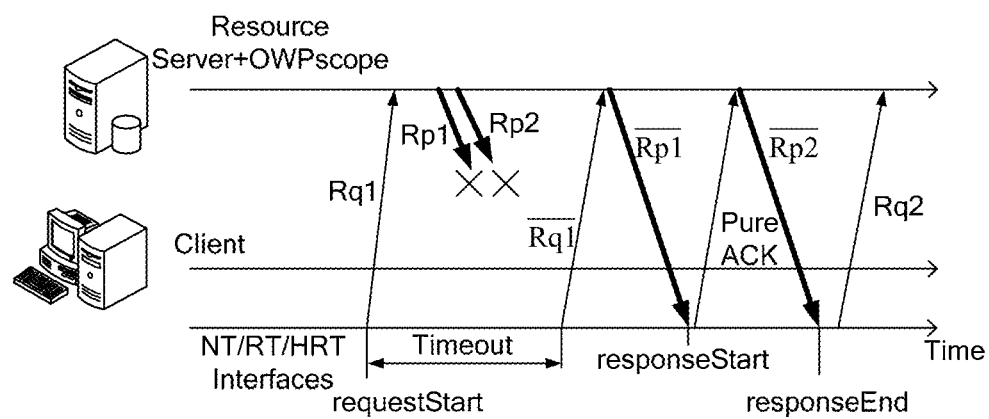
FIG. 6c shows the process of detecting both the first and second probing packets on the forward path are lost according to an embodiment of the present disclosure.

If both Rp1 and Rp2 are lost, the client device will retransmit the whole request (i.e., $\overline{Rq1}$) again, as shown in FIG. 6(c). The interval between the arrival time of Rq1 and that of $\overline{Rq1}$ is around C's RTO. The server will first retransmit Rp1 (i.e., $\overline{Rp1}$) that will trigger a pure ACK, and then retransmit Rp2 (i.e., $\overline{Rp2}$) after receiving the pure ACK. Then, the difference between Tpe and Tps approximates to RTT. Another request (i.e., Rq2) will be sent after Rp1 and Rp2 arrive.

2) One-way Packet Loss on the Backward Path

Figure 7A:
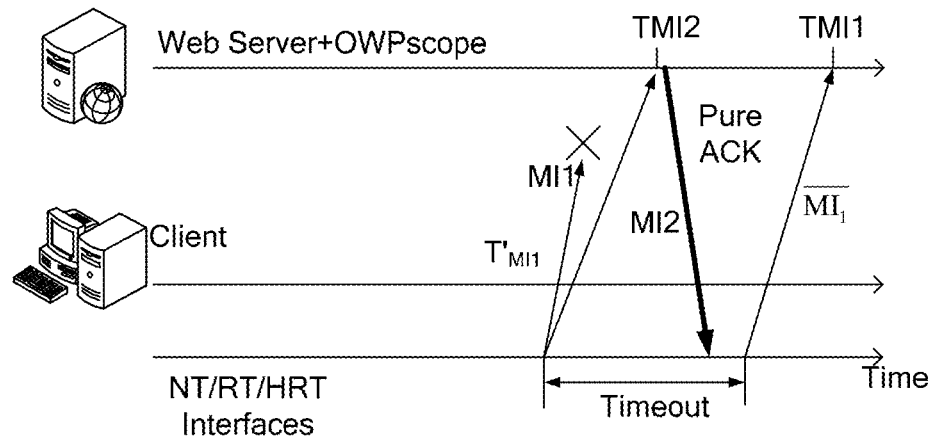
FIG. 7a shows the process of detecting the first backward-path packet is lost according to an embodiment of the present disclosure.
Figure 7B:
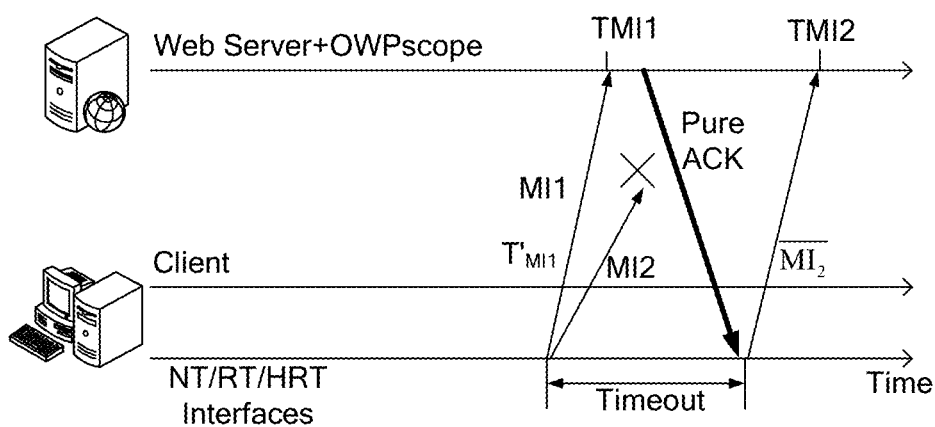
FIG. 7b shows the process of detecting the second backward-path packet is lost according to an embodiment of the present disclosure.
Figure 7C:
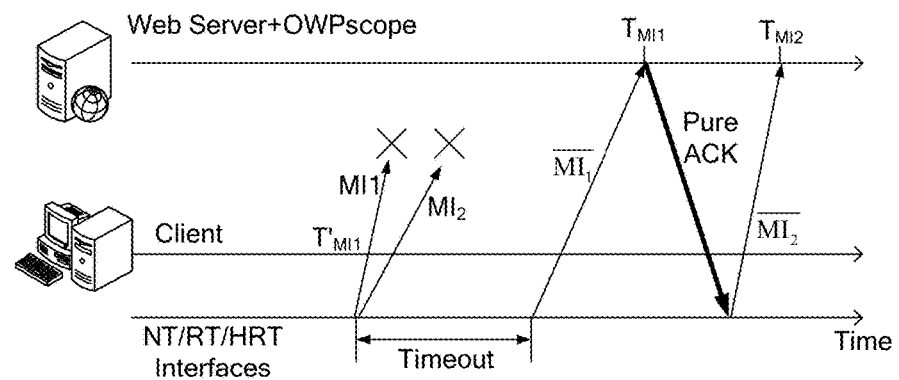
FIG. 7c shows the process of detecting both the first backward-path packet and the second backward-path packet are lost according to an embodiment of the present disclosure.

FIG. 7a to FIG. 7c illustrate how to detect backward-path packet loss. It is easy as two packets will be returned and OWPScope can capture them.

2.1) $MI_1$ is Lost

Referring to FIG. 7a, if $MI_1$ is lost, OWPScope first observes $MI_2$ and then retransmit $MI_1$. We use $d_M=|T_{MI2}-T_{MI1}|$ to differentiate it from the scenario when $MI_1$ and $MI_2$ are reordered, because in the former case $d_M$ is close to C's RTO whereas in the latter case $d_M$ is usually much smaller.

2.2) $MI_2$ is Lost

Referring to FIG. 7b, if $MI_2$ is lost, OWPScope first observes MI1 and $d_M$ is close to C's RTO.

2.3) Both $MI_1$ and $MI_2$ are Lost

Referring to FIG. 7c, if both packets are dropped and retransmitted, $(T_{MI1}-T'_{MI1})$ approximates to its normal value plus C's RTO.

2. One-way Packet Reordering
1) One-way Packet Reordering on the Backward Path

It is straightforward to detect packet reordering on the backward path because OWPScope captures all packets from C.

2) One-way Packet Reordering on the Forward Path

It is nontrivial to detect forward-path packet reordering since OWPScope cannot capture packets in C.

Figure 8:
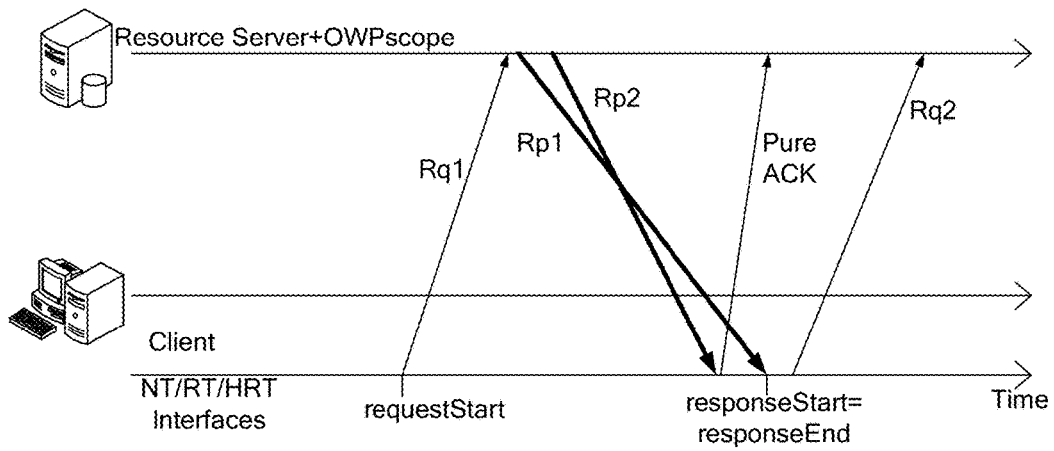
FIG. 8 shows the process of detecting forward-path packet reordering according to an embodiment of the present disclosure.

This problem may be tackled by letting in-order probing packets trigger responses different from that caused by out-of-order probing packets. As shown in FIG. 8, the arrival of Rp2 will induce a pure ACK packet whose acknowledge number is equal to the sequence number of Rp1. After receiving Rp1, C sends out a new request Rq2. Note that OWPScope can distinguish the forward-path packet reordering from forward-path packet loss according to Rq2 before retransmitting any packet, because C cannot send it until receiving Rp1 and Rp2 to the current request (i.e., Rq1). This method is effective because the time lag of reordered packets is quite small compared to the minimal one-way delay (for example, the ratio of the two is less than a preset threshold).

As shown in FIG. 8, a client device sends Rq1 to a server for requesting W. $SN_{Rq1}$ and $L_{Rq1}$ is the sequence number and length of Rq1, respectively. $R_{p1}$'s ACK number is $SN_{Rq1}+L_{Rq1}/2$ and $R_{p2}$'s ACK number is $SN_{Rq1}+L_{Rq1}$. In the case out-of-order occurs (that is, Rp1 is sent before Rp2 but Rp2 arrives at the client device first), the client device sends back a pure ACK packet after receiving Rp2. The ACK number of the pure ACK packet is equal to the sequence number of Rp1, according to which OWPScope determines Rp2 is received first. In the case Rp1 and Rp2 arrives at the client device in sequence, the OWPScope will receive Rq2 rather than the pure ACK whose ACK number is equal to the sequence number of Rp1.

3. One-way Capacity

1) One-way Capacity on the Forward Path

Let $C_j$ be the maximum number of bits that can be transmitted on the $j^{th}$ link. The one-way path capacity is equal to $\Omega=\min\{C_j\}, j=1, 2, \ldots L$, where L is the number of links that compose the path. In FIG. 5, OWPScope uses packet train to measure the forward-path capacity by sending N=2+Nu packets (2 probing packets and Nu padding packets) of size S bytes back-to-back. The packet dispersion observed by C is $\delta_N = T'_{RP2} - T'_{RP1}$. However, they cannot be obtained by OWPScope because we do not control C. Instead, in an example, $\delta_N$ may be estimated by using $T_{pe} - T_{ps}$ and then the capacity can be computed by Eq.(1) following.

$$\Omega_F = \frac{(N-1)S}{\delta_N + \varepsilon} = \frac{1 - \frac{1}{N}}{\frac{\delta_N}{N} + \frac{\varepsilon}{N}}, \quad (1)$$

where ε denotes the noise due to the approximation, S is the size of the probing packet/padding packet.

The rational behind this packet train based approach is three-fold.

First, the resolution of NT/RT (i.e., millisecond) limits the minimal $\delta_N$ that that can be measured and, thus, the maximal capacity that can be measured by a packet-pair based method (i.e., N=2). In contrast, $\delta_N$ can be increased by a long packet train.

Second, the approximation may be biased by the noise from OS/browser. Eq.(1) shows that the effect of noise can be mitigated by increasing N.

Third, although a packet train measures the average dispersion rate (ADR) in the presence of severe cross traffic, ADR has two good properties: it is independent of the length of packet train (i.e., N) so that OWPScope can increase N to mitigate the effect of noise; the effect of cross traffic can be alleviated by increasing the sending rate of probing packets.

In an example, the minimum-delay-sum principle can be further employed to filter out biased samples. Let $d_{f1} = T_{ps} - T_{Rp1}$ and $d_{f2} = T_{pe} - T_{Rp2}$. The principle specifies that if the probing packets are affected by cross traffic, the sum of packet delays will be increased. Therefore, in an example, only samples that fulfill Eq.(2) should be used to compute the forward-path capacity, so as to improve the accuracy of forward-path capacity.

$$\min\{d_{f1} + d_{f2}\} = \min\{d_{f1}\} + \min\{d_{f2}\} \quad (2)$$

2) One-way Capacity on the Backward Path

OWPScope use packet pair to measure backward-path capacity as shown in Eq.(3), because it can capture packets from C with high-resolution timestamp.

$$\Omega_B = S/T_{MI2} - T_{MI1}' \quad (3)$$

where S denotes the size of the packet sent by the client device (equal to the size of the probing packet).

In a similar example, we define $d_{b1} = T_{MI2} - T'_{MI1}$ and $d_{b2} = T_{MI1} - T'_{MI1}$ and use Eq.(4) to select unbiased samples for calculating the backward-path capacity, so as to improve the accuracy of backward-path capacity. $T'_{MI1}$ may be obtained through HRT.

$$\min\{d_{b1} + d_{b2}\} = \min\{d_{b1}\} + \min\{d_{b2}\} \quad (4)$$

4. One-way Jitter

Let $D_f = T_{ps} - T_{Rp1}$ and $D_b = T_{Rq} - T_{qs}$. Note that $D_f$ and $D_b$ are not one-way delays, because the server and the client device are usually not synchronized. Given a sequence of $D_f$ and $D_b$ samples, forward-path jitter and backward path jitter can be computed using Eq.(5.1) and Eq.(5.2).

$$\theta_f(i) = D_f(i+1) - D_f(i) \quad (5.1)$$

$$\theta_b(i) = D_b(i+1) - D_b(i) \quad (5.2)$$

Since the clock skew in typical computer is around 1 part per million (ppm), if the interval between samples is small (e.g., 100 ms), the error in jitter measurement due to clock skew is negligible (i.e., 0.1 us). Otherwise, the relative clock skews may be removed by for example using the methods as described in "*Remote Physical Device Fingerprinting*".

Figures 9, 10:
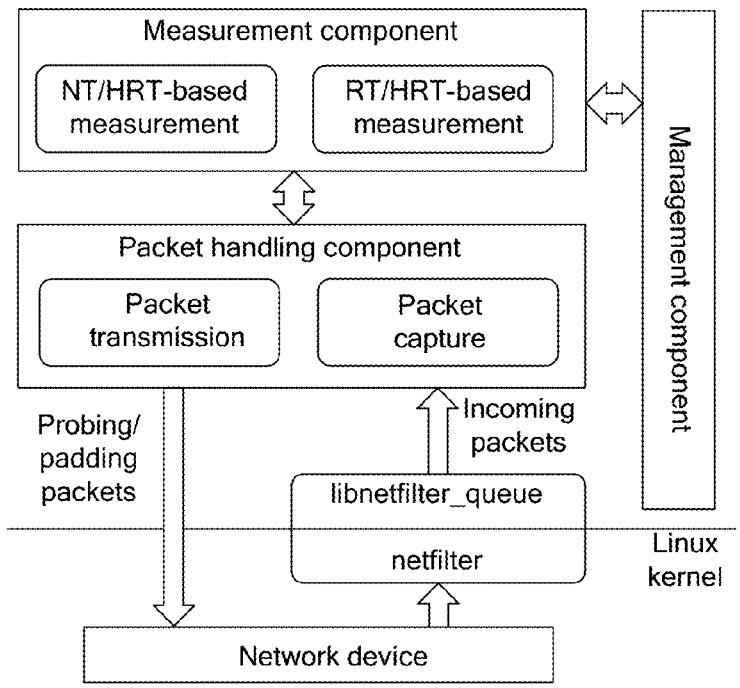
FIG. 9 shows the architecture of OWPScope according to an embodiment of the present disclosure.
FIG. 10 shows approximation accuracy of using NT/RT in different OS/browsers w/o intentionally introduced CPU load, each cell contains the average value in millisecond and the standard deviation, in which L: Linux; W: Windows; FF: FireFox; CH: Chrome; IE: Internet Explorer, FireFox (v26) does not support RT.

FIG. 9 illustrates the architecture of OWPScope's server-side module according to an embodiment of the present disclosure, which consists of three components. The measurement component will conduct RT-based or NT-based measurement depending on their availability. The former is preferred since RT allows us to conduct multiple measurements through several web objects in one web page.

The packet handling component sends probing/padding packets through raw socket and capture incoming packets through libnetfilter queue.

The management component forwards parameters and the js code to the measurement component and then obtains the raw measurement results (i.e., a sequence of timing information for each web object) from it. After processing the raw data (e.g., compute the loss rate, capacity, etc.), the management component will make decision according to service logic (e.g., redirect a client device to the most suitable server in the CDN scenario) and store the results.

Since $T_{pe} - T_{ps}$ is used to approximate to $\delta_N$ (i.e., $T'_{RP2} - T'_{RP1}$), the following will evaluate its approximation accuracy.

Approximation Accuracy of Using NT/RT

The approximation accuracy is evaluate in two settings, including a Linux machine (i3 CPU 2.4 GHZ and 8 GB memory) running Ubuntu 12.04 with FireFox (v26) and Chrome (v32), and a Window machine with the same hardware running Windows 7 with IE (v11), FireFox (v26) and Chrome (v32). We delay Rp2 by β (β∈{30,50,100, 150}ms) to evaluate packet dispersion and use WireShark to capture Rp1 and Rp2 at the client device side for calculating $T'_{RP2} - T'_{RP1}$. For each setting, we run the experiment for 30 times and calculate the mean and the standard deviation. Moreover, we also examine the result after introducing 25% CPU load to the PC.

FIG. 10 shows that the majority of the differences are within [−1, 1]ms. It is acceptable as OWPScope can further increase N to mitigate the effect of noise as shown in Eq.(1). The difference obtained in Linux is usually smaller than that in Windows. The largest difference was observed when using NT within IE in Windows. In contract, the difference is not significant when RT is used in IE. It may be due to the implementation deficiencies as both NT and RT are new standards. By studying the source codes of FireFox and Chrome, we did observe some implementation issues, including:

(1) Chrome records responseStart after processing an HTTP header while Firefox does it before processing the header. It may be the reason why Chrome's difference increases with additional CPU load;

(2) In Windows, Chrome uses the function timeGetTime( ) to retrieve the system time in milliseconds while Firefox uses the function QueryPerformanceCounter( ) for retrieving timestamp with higher resolution. It may be the reason why Chrome has worse performance than FireFox;

(3) To ensure the timestamp increases monotonically, Chrome introduces a set of functions that will adjust the raw timestamp. These functions may introduce additional noise;

(4) Some issues in Chrome might have been discovered. For example, we found a "FIXME" comment in the function responseStart( ) saying that the time of responseStart may be delayed.

Many experiments are conducted to evaluate advantages the OWPScope.

1. Controlled Experiments

Figure 11:
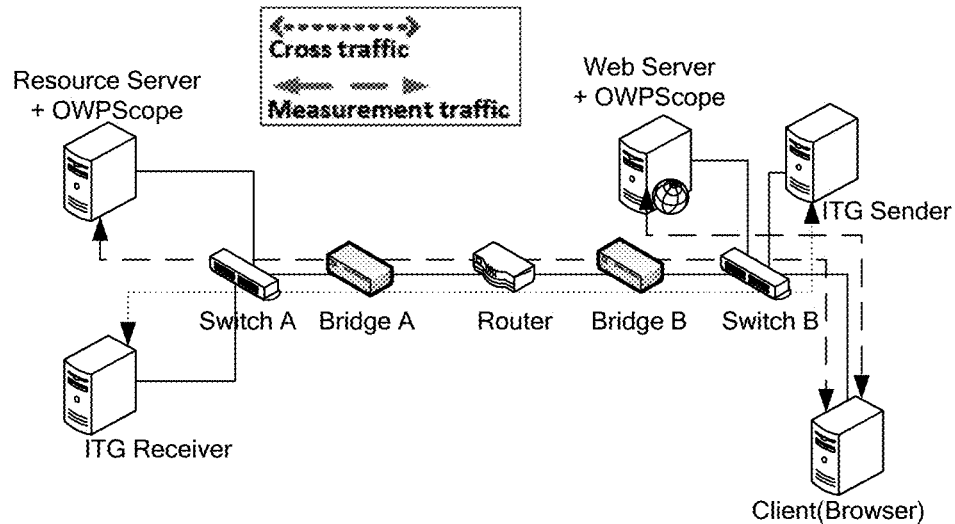
FIG. 11 shows the topology of the testbed.

We validate OWPScope in a testbed shown in FIG. 11, where server-side modules of OWPScope are deployed in a resource server and a web server. A MikroTik router is used to limit the network capacity and D-ITG is employed to generate cross traffic.

Packet Loss and Packet Reordering

To validate the detection of packet losses, we intentionally drop Rp1 and/or Rp2. To emulate packet reordering on the forward path, we let OWPScope send Rp2 before Rp1. The responses from the client device in these scenarios follow what described before.

Capacity

To evaluate OWPScope's capability of measuring capacity, we change the capacity of the path between the client device and the resource server, and adjust the packet train's length (i.e., N). We run the experiment 30 times for each setting and list the mean and the standard deviation of estimated capacities in Table 1. The results show that OWPScope can accurately estimate the capacity with small standard deviation. Moreover, a longer packet train leads to better estimates, thus validating Eq.(1).

TABLE 1

Capacity measurement in the testbed. N is the length of packet train and $\Omega_F$ is the estimated capacity.

| | 2 Mbps | | 5 Mbps | | 10 Mbps | |
|---|---|---|---|---|---|---|
| N | 10 | 30 | 30 | 50 | 50 | 100 |
| $\Omega_F$ | 2.17/0.19 | 2.07/0.05 | 5.61/0.37 | 5.35/0.15 | 10.09/0.2 | 10.02/0.07 |

System Load

We use siege (www.joedog.org) to simulate visitors to the resource server, who generate different number of packets (i.e., 10, 30, 100). For each setting, siege runs for 10 minutes and we log the average load at the end of each minute. Table 2 lists the mean of the ten results, showing that OWPScope introduces light overhead to the hosting server.

TABLE 2

Load of the resource server.

| Number of users | 10 packets | 30 packets | 100 packets |
|---|---|---|---|
| 50 | 0.04 | 0.046 | 0.08 |
| 100 | 0.045 | 0.056 | 0.085 |

2. Internet Experiments

Capacity

Following FIG. 4, a web server is set up in a campus network with limited capacity of 5 Mbps and four resource servers are deployed in Amazon EC2, which are located in Singapore (SG), California (US), Tokyo (JP), and Sao paulo (BR), individually. OWPScope is deployed on those servers and uses RT to perform the measurement. We run IE 11 on window 8.1 and Chromium 32.0 on Ubuntu 12.04 from a residential network to visit the web server's front page, which includes images in different resource servers. The download capacity of the residential network is 10 Mbps (i.e., the forward-path capacity). Due to limited pages, we only report the result for forward-path capacity as shown in Table 3. Since the estimated capacity of the four Internet paths are all around 10 Mbps, the bottleneck may be the residential network. As the web server has smaller capacity (i.e., 5 Mbps), it becomes the bottleneck of that path. Table 3 shows that the estimation accuracy increases with N, which is in consistent with Eq.(1), and two browsers lead to similar results.

TABLE 3

The estimated forward-path capacity (in Mbps) of five Internet paths. Each cell has two average values obtained from Chrome and IE.

| N | SG | US | JP | BR | Campus |
|---|---|---|---|---|---|
| 32 | 11.27/10.99 | 11.25/10.69 | 10.98/10.68 | 11.07/11.15 | 5.55/5.27 |
| 42 | 10.30/10.10 | 10.49/10.84 | 10.40/11.02 | 10.27/10.61 | 5.25/5.40 |
| 52 | 10.33/10.24 | 10.07/10.32 | 9.96/10.11 | 9.61/10.05 | 5.22/5.21 |

For comparison, we use other tools, including Speedtest, NPad, Netalyzr and Boomerang, to estimate the capacity from their servers to the same client device. Speedtest selects one of its servers in the same region. NPad's server is hosted by M-Lab and Netalyzer has its own server. Since boomerang requires the user to set up a server, we deploy it on an EC2 host in US. For each tool, the measurements were repeated for 10 times and the average values for the traffic volume, number of packets, and the estimated capacity are computed and shown in Table 4.

TABLE 4

Other systems' results and their traffic consumption.

| Tool | Traffic Volume (MB) | Number of packets | $\Omega_F$ (Mbps) |
|---|---|---|---|
| speedtest | 38.6 | 40,336 | 9.14 |
| npad | 30.7 | 21,826 | 8.12 |
| netalyzr | 98.86 | 198,936 | 9.29 |
| boomerang | 2.06 | 2,111 | 1.78 |

While Speedtest and Netalyzr can achieve better performance in capacity measurement than NPad and boomerang, their accuracies are still lower than that of OWPScope. Speedtest generated around 40 MB traffic for estimating RTT and upload/download speed. In contrast, OWPScope can measure multiple one-way path metrics with much fewer packets. Although boomerang only generated around 2 MB traffic, its estimation is not reliable. Since Netalyzr conducted many other measurements besides capacity estimation, it generated almost 200 MB traffic, consuming much bandwidth.

Path Performance Over Time

Figure 12A:
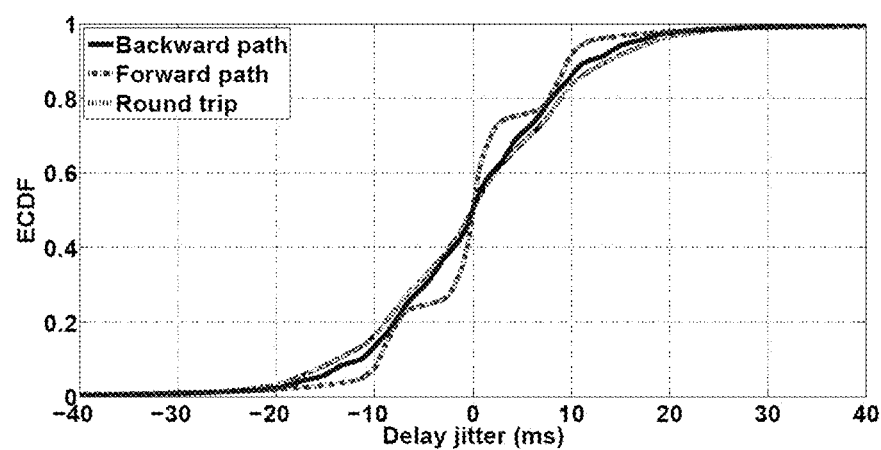
FIG. 12*a* shows one-way delay jitter and round-trip delay jitter.
Figure 12B:
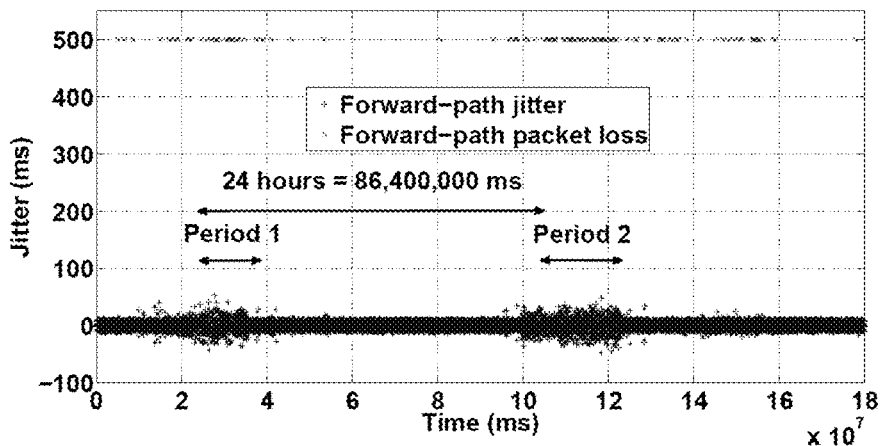
FIG. 12*b* shows forward-path delay jitter and packet loss.
Figure 12C:
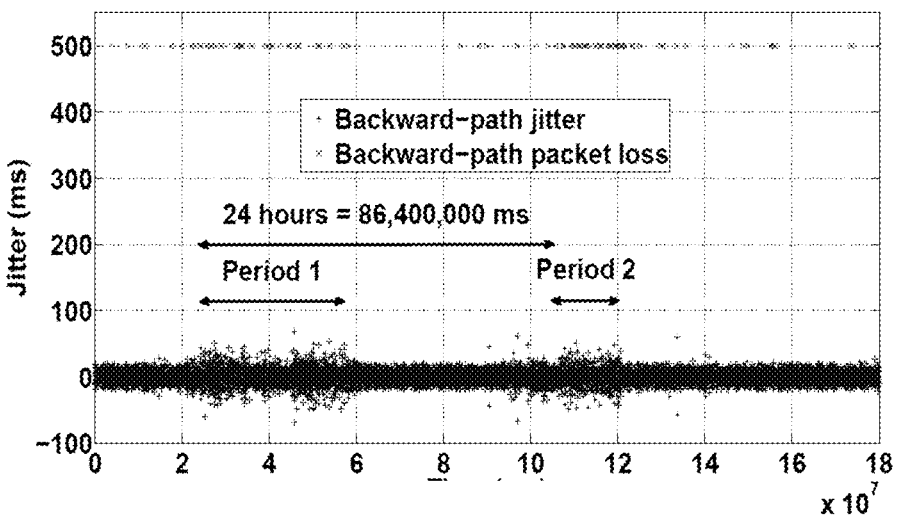
FIG. 12*c* shows backward-path delay jitter and packet loss.

We deploy OWPScope and a web server on an EC2 host in US, and launch a Chrome browser in the campus network to periodically visit the server for two days. As shown in FIG. 12(a), the forward-path jitter does not have the same distribution as the backward-path jitter and the round-trip jitter. Note that knowing one-way jitter is useful for services sensitive to it (e.g., online streaming). FIG. 12(b) and FIG. 12(c) show the time sequence of one-way jitter and packet loss. Both metrics demonstrate a diurnal pattern (e.g., period 1 and period 2 in both figures). Moreover, there is an obvious correlation between jitter and packet loss (i.e., larger jitter accompanied with more packet loss). Note that the forward path and the backward path exhibited different performance.

NT and/or RT have been quickly adopted by the industry. For example, Google uses them to measure "perceived latency" and provides site speed reports. Yahoo adds the support of NT in boomerang. However, to our best knowledge, OWPScope is the first system exploiting NT/RT for measuring low-level one-way path metrics.

Although several server-side measurement systems have been proposed, none of them can measure one-way metrics like OWPScope.

While some non-cooperative tools have been developed to measure one-way metrics, the majority of them were designed as a client-device-side tool without considering the requirements of server-side measurement. For example, client device's firewall will filter out unsolicited TCP/UDP/ICMP packets and thus renders some tools useless. Some tools only support one or two types of one-way metrics (e.g., Sting for packet loss, CapProbe for packet reordering). Although TRIO can measure one-way capacity on top of OneProbe, the estimation of forward-path capacity may be affected by the noise in the reverse path. In summary, none of these tools has the same capability as OWPScope.

Thus, the major advantages of the present disclosure include:

1) The OWPScope empowers web servers to simultaneously measure four low-level one-way path metrics, i.e., packet loss, packet reordering, capacity, and jitters;

2) OWPScope exploits only standard features in HTML5, HTTP, and TCP without requiring specific software/plugins installed at the client device side;

3) With specially crafted probe packets in an established TCP connection, OWPScope can penetrate client-device-side firewalls and perform measurement with low overhead by correlating information gleaned from the application and the TCP levels;

4) OWPScope uses packets carrying real application data (i.e., probing packets) to conduct representative measurement, avoiding causing heavy overhead.

When implemented in form of a software functional module and sold or used as an independent product, a module/unit of an embodiment of the present disclosure may also be stored in a non-transitory computer-readable storage medium. Based on such an understanding, the essential part or a part of the technical solution of an embodiment of the present disclosure contributing to prior art may appear in form of a software product, which software product is stored in storage media, and includes a number of instructions for allowing a computer equipment (such as a personal computer, a server, a network equipment, or the like) to execute all or part of the methods in various embodiments of the present disclosure. The storage media include various media that can store program codes, such as a U disk, a mobile hard disk, a Read-Only Memory (ROM), a magnetic disk, a CD, and the like. Thus, an embodiment of the present disclosure is not limited to any specific combination of hardware and software.

Accordingly, an embodiment of the present disclosure further provides a non-transitory computer storage medium storing instructions (which may be executed by a processing circuit) thereon for executing any information processing method according to any embodiment of the present disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

While the foregoing disclosure discusses illustrative aspects and/or embodiments, it should be noted that various changes and modifications could be made herein without departing from the scope of the described aspects and/or embodiments as defined by the appended claims.

The invention claimed is:

1. A method applied in a server having one or more processors and a memory for storing program modules that are executed by the one or more processors, the method comprising:

receiving a request for service data from a client device;

in response to the request for service data, identifying service data corresponding to the request and encapsulating the identified service data into at least two probing packets including a first probing packet and a second probing packet;

sending the at least two probing packets which contain the service data to the client device on a forward path which is from the server to the client device;

obtaining, from the client device, at least two backward-path packets sent by the client device after receiving the at least two probing packets on a backward path from the client device to the server, the at least two backward-path packets carrying timing information at least partially based on the at least two probing packets, which comprises: a time stamp corresponding to the service data including a first time stamp indicating the time when the client device receives the first probing packet and a second time stamp indicating the time when the client device completely receives the second time stamp, a time stamp corresponding to the request for the service data, and time stamps corresponding to the at least two backward-path packets sent by the client device; and determining according to the timing information a one-way path metric, further comprising:

determining that the first probing packet is lost on the forward path when the first time stamp is equal to the second timestamp;

determining that the second probing packet is lost on the forward path when a difference between the second time stamp and the first time stamp corresponds to a Retransmission TimeOut (RTO) of the server; and determining that both the first probing packet and second probing packet are lost on the forward path when a difference between the second time stamp and the first time stamp corresponds to a Round-Trip Time (RTT).

2. The method according to claim 1, wherein when there are two backward-path packets consisting of a first backward-path packet and a second backward-path packet, the time stamp corresponding to at least two backward-path packets sent by the client device on a backward path comprises a third time stamp indicating the time when the first backward-path packet is received and a fourth time stamp indicating the time when the second backward-path packet is received, wherein in the case the one-way path metric is backward-path packet loss, the determining according to the timing information a one-way path metric comprises:

determining the first backward-path packet is lost, when the second backward-path packet arrives before the first backward-path packet and a difference between the fourth time stamp and the third time stamp corresponds to the RTO of the client device;

determining the second backward-path packet is lost, when the first backward-path packet arrives before the second backward-path packet and a difference between the fourth time stamp and the third time stamp corresponds to the RTO of the client device; and determining both the first backward-path packet and second backward-path packet are lost, when the first backward-path packet arrives before the second backward-path packet, and a difference between the fourth time stamp and the third time stamp corresponds to it normal value plus the RTO of the client device.

3. The method according to claim 1, wherein in the case the one-way path metric is forward-path packet reordering, the determining according to the timing information a one-way path metric comprises:

determining whether an acknowledge (ACK) packet whose ACK number is equal to the sequence number of the first probing packet is received; and in the case it is, determining forward-path packet reordering occurs.

4. The method according to claim 1, wherein in the case the one-way path metric is forward-path capacity, the determining according to the timing information a one-way path metric comprises:

determining the forward-path capacity by dividing a size of the probing packet by a sum of a difference between the second time stamp and the first time stamp plus a noise.

5. The method according to claim 4, wherein there are Nu padding packets dispatched between the first and second probing packets, wherein Nu is an integer greater than 0, wherein each padding packet has a Time To Live (TTL) less than the TTL of each of the first and second probing packets, wherein the forward-path capacity is determined by dividing a product of Nu−1 and the size of the probing packet by a sum of a difference between the second time stamp and the first time stamp plus the noise.

6. The method according to claim 5, wherein biased time stamps are filtered out before determining the forward-path capacity.

7. The method according to claim 1, wherein there are two backward-path packets consisting of a first backward-path packet and a second backward-path packet, the time stamp corresponding to at least two backward-path packets sent by the client device on a backward path comprises a third time stamp indicating the time when the first backward-path packet is received and a fourth time stamp indicating the time when the second backward-path packet is received, wherein in the case the one-way path metric is backward-path capacity, the determining according to the timing information a one-way path metric comprises:

determining the backward-path capacity by dividing a size of the backward-path packet by a difference between the fourth time stamp and the third time stamp.

8. The method according to claim 7, wherein biased time stamps are filtered out before determining the backward-path capacity.

9. The method according to claim 1, wherein in the case the one-way path metric is forward-path jitter, the determining according to the timing information a one-way path metric comprises:

determining the forward-path jitter by subtracting a fourth difference value from a fifth difference value, wherein the fourth difference value is equal to a difference between a time stamp when the client device sends the request for the $i^{th}$ service data and a time stamp when the server sends a corresponding probing packet for the initial time, wherein the fifth difference value is equal to a difference between a time stamp when the client device sends the request for the $(i+1)^{th}$ service data and a time stamp when the server sends a corresponding probing packet for the initial time.

10. The method according to claim 1, wherein in the case the one-way path metric is backward-path jitter, the determining according to the timing information a one-way path metric comprises:

determining the backward-path jitter by subtracting a sixth difference value from a seventh difference value, wherein the sixth difference value is equal to a difference between a time stamp when the client device sends the request for the $i^{th}$ service data and a time stamp when the server receives the request for the $i^{th}$ service data, wherein the seventh difference value is equal to a difference between a time stamp when the client device sends the request for the (i+1)$^{th}$ service data and a time stamp when the server receives the request for the (i+1)$^{th}$ service data.

11. A non-transitory computer-readable storage medium storing instructions thereon for execution by at least one processing circuit, the instructions comprising:

receiving a request for service data from a client device;

in response to the request for service data, identifying service data corresponding to the request and encapsulating the identified service data into at least two probing packets including a first probing packet and a second probing packet;

sending the at least two probing packets which contain the service data to the client device on a forward path which is towards the client device;

obtaining, from the client device, at least two backward-path packets sent by the client device after receiving the at least two probing packets on a backward path from the client device to the server, the at least two backward-path packets carrying timing information at least partially based on the at least two probing packets, which comprise: a time stamp corresponding to the service data including a first time stamp indicating the time when the client device receives the first probing packet and a second time stamp indicating the time when the client device completely receives the second time stamp, a time stamp corresponding to the request for the service data, and time stamps corresponding to the at least two backward-path packets sent by the client device; and determining according to the timing information a one-way path metric, further comprising:

determining that the first probing packet is lost on the forward path when the first time stamp is equal to the second timestamp;

determining that the second probing packet is lost on the forward path when a difference between the second time stamp and the first time stamp corresponds to a Retransmission TimeOut (RTO) of the server; and determining that both the first probing packet and second probing packet are lost on the forward path when a difference between the second time stamp and the first time stamp corresponds to a Round-Trip Time (RTT).

12. The non-transitory computer-readable storage medium according to claim 11, wherein in the case the one-way path metric is forward-path packet reordering, the determining according to the timing information a one-way path metric comprises:

determining whether a ACK packet whose ACK number is equal to the sequence number of the first probing packet is received; and in the case it is received, determining forward-path packet reordering occurs.

13. The non-transitory computer-readable storage medium according to claim 11, wherein in the case the one-way path metric is forward-path capacity, the determining according to the timing information a one-way path metric comprises:

determining the forward-path capacity by dividing a size of the probing packet by a sum of a difference between the second time stamp and the first time stamp plus a noise.

14. The non-transitory computer-readable storage medium according to claim 13, wherein in the case the one-way path metric is forward-path jitter, the determining according to the timing information a one-way path metric comprises:

determining the forward-path jitter by subtracting a fourth difference value from a fifth difference value, wherein the fourth difference value is equal to a difference between a time stamp when the client device sends the request for the i$^{th}$ service data and a time stamp when the server sends a corresponding probing packet for the initial time, wherein the fifth difference value is equal to a difference between a time stamp when the client device sends the request for the (i+1)$^{th}$ service data and a time stamp when the server sends a corresponding probing packet for the initial time.

15. A device applied in a server, comprising:

one or more processors; and a memory coupled to the one or more processors;

program modules stored in the memory, the program modules being executable by the one or more processors to:

receive a request for service data from a client device;

in response to the request for service data, identifying service data corresponding to the request and encapsulating the identified service data into at least two probing packets including a first probing packet and a second probing packet;

send the at least two probing packets which contain the service data to the client device on a forward path which is from the server to the client device;

obtain, from the client device, at least two backward-path packets sent by the client device after receiving the at least two probing packets on a backward path from the client device to the server, the at least two backward-path packets carrying timing information at least partially based on the at least two probing packets, which comprises: a time stamp corresponding to the service data including a first time stamp indicating the time when the client device receives the first probing packet and a second time stamp indicating the time when the client device completely receives the second time stamp, a time stamp corresponding to the request for the service data, and time stamps corresponding to the at least two backward-path packets sent by the client device; and determine according to the timing information a one-way path metric, further comprising:

determining that the first probing packet is lost on the forward path when the first time stamp is equal to the second timestamp;

determining that the second probing packet is lost on the forward path when a difference between the second time stamp and the first time stamp corresponds to a Retransmission TimeOut (RTO) of the server; and determining that both the first probing packet and second probing packet are lost on the forward path when a difference between the second time stamp and the first time stamp corresponds to a Round-Trip Time (RTT).

* * * * *